Aug. 13, 1935. M. C. SCHRANK Re. 19,669

WRAP-AROUND GARMENT

Original Filed April 5, 1933 2 Sheets-Sheet 1

Inventor
Max C. Schrank,
By
Dwight R. Ames
Attorney

Aug. 13, 1935. M. C. SCHRANK Re. 19,669
WRAP-AROUND GARMENT
Original Filed April 5, 1933 2 Sheets-Sheet 2
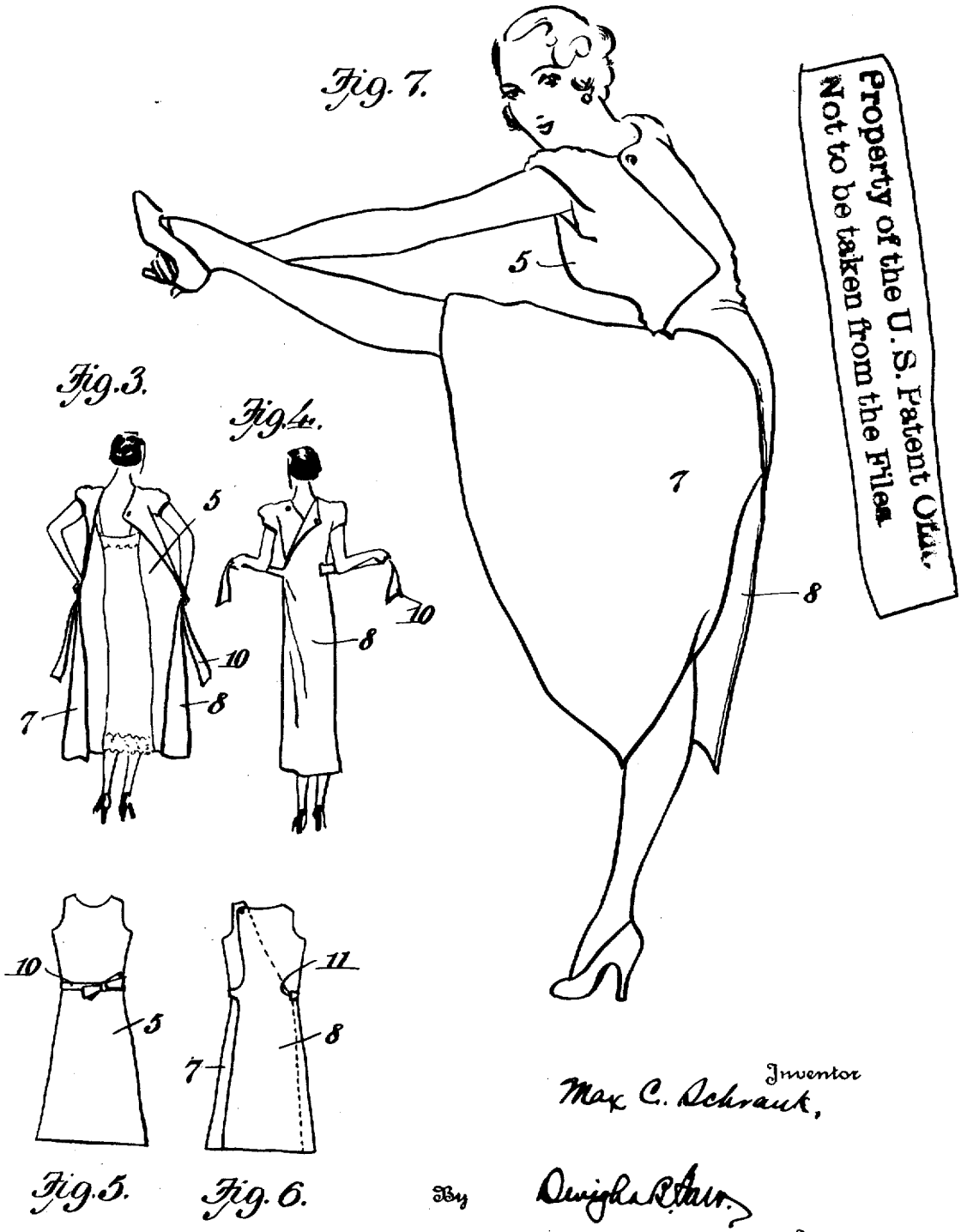
Property of the U. S. Patent Office
Not to be taken from the Files
Inventor
Max C. Schrank,
By Dwight R. Starr
Attorney Reissued Aug. 13, 1935

Re. 19,669

UNITED STATES PATENT OFFICE 19,669

WRAP-AROUND GARMENT

Max C. Schrank, Bridgeton, N. J.

Original No. 1,988,053, dated January 15, 1935, Serial No. 664,607, April 5, 1933. Application for reissue January 30, 1935, Serial No. 4,200

3 Claims. (Cl. 2—74)

This invention relates generally to feminine apparel, and particularly to slip-on garments of the wrap-around type.

Slip-on garments heretofore proposed and more or less successfully employed, include structures with the edges meeting and overlapping at the front and donned and removed in a manner similar to coats. Such garments are designed particularly to be used over a dress to serve the purpose of a smock or apron. If used in lieu of a dress, garments of this type present several objections, chief among which is that they do not afford the wearer sufficient protection because of the fact that in stepping, walking or running the action of the lower legs tends to kick open the overlapped front portions, however, great the overlapping may be. A further objection is that front overlapped garments present decided limitations as to styling, because of the fact that they must necessarily be styled as coats or wrappers, and are thus restricted to the limited amount of styling that may be done on a front opening dress.

The present invention aims to provide a slip-on wrap-around garment to be used instead of a dress, possessing all of the advantages of the front opening garment heretofore proposed, with an added advantage of overcoming objections incident to front overlap structures, and providing a garment wherein the field of styling is practically unlimited.

The invention consists generally in the provision of a slip-on of the wrap-around effect to be worn as a frock in lieu of a dress, wherein the overlap occurs at some point other than the front, in order that the front may be adaptable to desired styling, and wherein the action incident to walking or stretching the limbs tends to close the overlap rather than to cause the same to open. It is preferred that this overlap occur at the rear or back of the garment where the natural tendency of the overlapped portion will be to follow and close upon the legs of the wearer when in the act of walking or stretching the legs. Though not restricted to such use, a garment possessing these characteristics is of particular value and advantage in domestic or sport activities, where lightness of garments, free body movement and proper coverage are at all times essential.

With these objects in view, together with others which will appear as the description proceeds, the invention consists in the novel construction, combination and arrangement of parts, all as will be described more fully hereinafter, illustrated in the drawings and particularly pointed out in the claims.

In the drawings:—

Fig. 3 is the rear view of a figure showing the manner of applying the garment, Fig. 4 is a similar view showing a further step in applying the garment, Fig. 5 is a front elevation of the garment as it will appear when properly applied to the figure.

Fig. 6 is a rear elevation of the garment as shown in Fig. 5, and

Fig. 7 is a view of the garment as it will appear when applied to a form and disclosing the freedom of leg movement without exposing the covered form.

Figure 1:
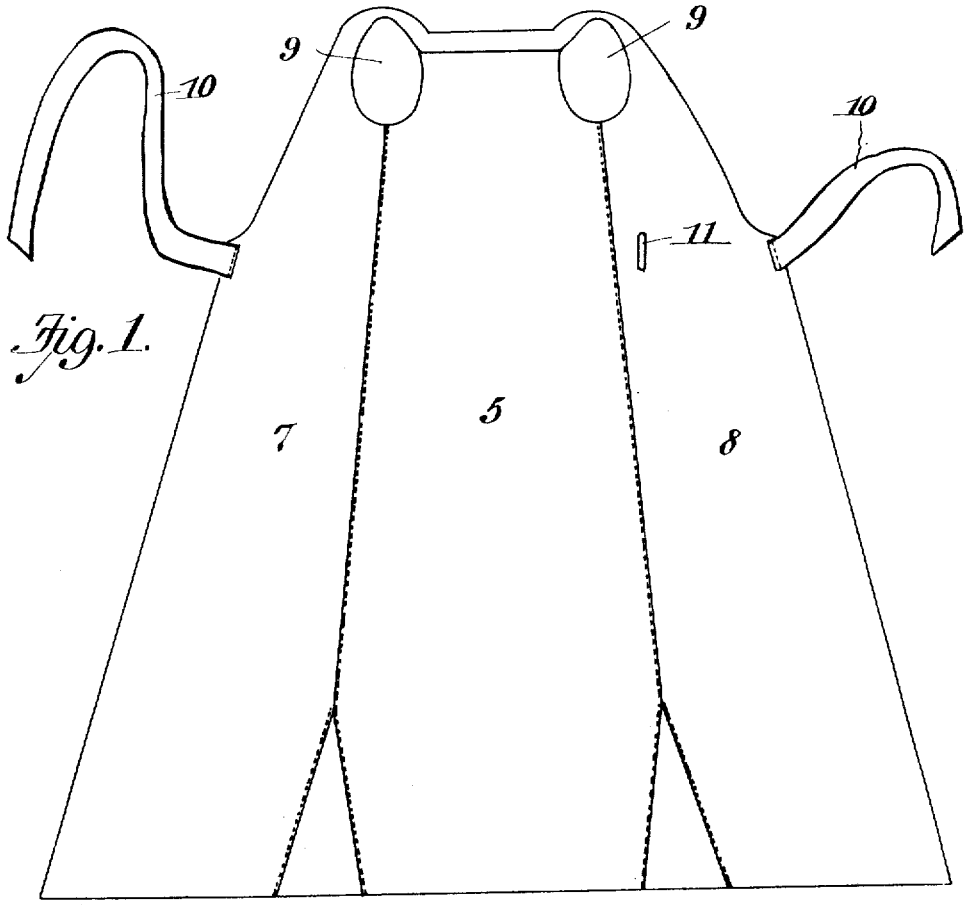
Fig. 1 is a plan view of the improved garment as viewed from the inside.
Figure 2:
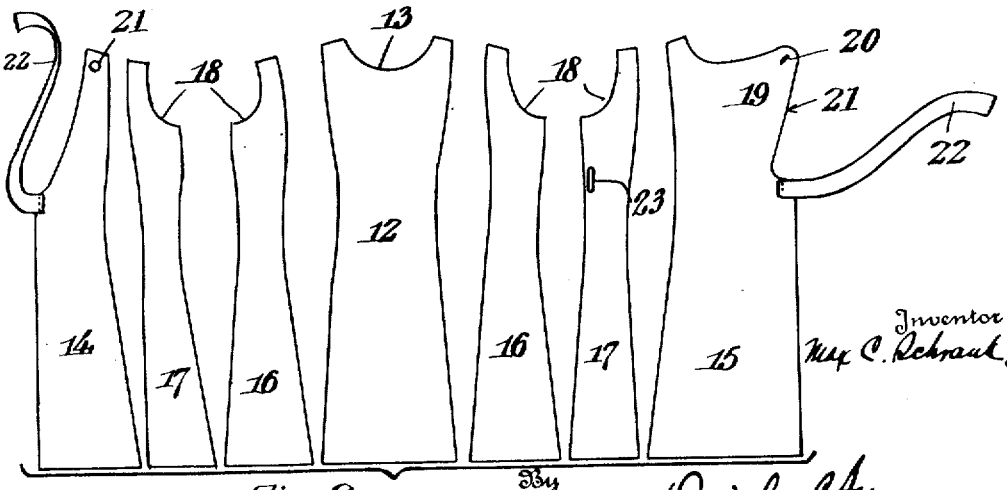
Fig. 2 is a plan view of a series of gores which when assembled and stitched together constitute another form of the invention.

In carrying out the invention, I provide a garment including combined waist and skirt portions which may be made of one piece or of separate pieces stitched together. The upper portion of the waist is provided with armholes or suitable openings or cut away portions to receive the arms so that the garment may be put on from the front and the sides brought around in form enclosing manner and into overlapping position at the rear of the wearer. Suitable tapes may be secured to the edges of the garment at the waistline in order that the garment may be properly adjusted and the overlapped edges held in proper place. A garment so constructed lends itself admirably and in an unlimited manner to variations in styling, while at the same time it obviates exposure of the limbs when walking or in other forward tending movements. It will be understood that the armholes may be fitted with sleeves if desired, or the upper portion of the waist part may be cut away to produce suntan effect beneath the arms and in the back. More specifically, the garment comprises a front 5 and side or rear portions 7—8, all of which are of sufficient length to provide waist and skirt portions and which when properly assembled are of sufficient breadth to entirely encircle the body and to provide a substantial overlap at the rear of the body.

The upper part of the waist portion is provided with armholes 9, which may or may not be fitted with sleeves as desired. The front and rear portions of the garment may be all included in one piece or may consist of gores properly cut and stitched together along adjacent adges. A preferred manner of securing the garment in proper form fitting relation upon the body resides in tapes 10, one secured to a lateral edge of each rear portion at substantially the waistline thereof, and these tapes pass from rear to front around the waist and may be tied together at the front or at the side of the body. To facilitate overlapping of the tapes, an opening 11 is provided in one of the side portions of the structure at the waistline thereof, and through which one of the tapes may be passed. It will be understood that the tapes need not be tied to each other but may be secured each to some other part of the garment at the sides, depending upon the effect desired. Moreover, it will be understood that fastening means other than those described may be employed if desired.

In order to produce the effects and the results desired the garment increases in width from the upper part or waistline thereof to the lower edge of the skirt portion. This is in order that a proper fullness in the skirt be provided to create a substantial overlap at the rear, sufficient to at all times and under all contemplated conditions secure privacy. In instances where it is desired kick pleats may be provided in the lower portion of the skirt in order to increase fullness.

In one development of the invention, I find it very practical to construct the slip-on garment of a plurality of gores, one of which 12 includes the front and is of substantially the breadth of the normal human body, having a cutaway neck portion at 13 and reduced in breadth at the waist portion to produce a form fitting effect. The rear gores 14—15 are relatively wide, and have their inner edges shaped or curved inwardly adjacent the waist, while a pair of intermediate gores 16 and 17 are interposed between the front and each of the said rear gores. The adjacent edges of all of these gores are so shaped as when stitched together to provide a styled form fitting garment, while the lower portions of such gores are of such width as to provide sufficient fullness in the skirt portion to permit of a substantial overlap when the garment is applied to the figure. The upper portions of the intermediate gores 16—17 are cut away at 18 so as to provide arm openings. The gore 15 has its upper portion 19 cut or shaped so as to lay across the back of the wearer, and is provided with a buttonhole 20 to receive a button 21 carried by the opposite rear panel 14. The outer edge of the gore 15 slants inwardly toward the waistline as at 21 in order to produce a form fitting effect. The gores 14—15 are provided with ties or tapes 22 in order that the garment may be held together at the waistline, and one of the intermediate panels 17 is provided with a loop or oponing 23 through which one of the tapes may be passed to produce a meeting of the tapes at the front of the garment. The edge (see Fig. 6) of the upper part of the button-carrying panel diverges from the upper part of the armhole portion thereof to the waistline of the garment at the opposite side of the wearer and thereby the back of the wearer especially at and immediately above the waist is covered by substantial overlapping portions of the under and outer back panels so that a satisfactory fit or setting of the garment to the back of the wearer is assured.

With a garment constructed in accordance with the foregoing, it is at once apparent that the same may be used as a slip-over or in lieu of a dress. The garment is donned by extending the arms forwardly through the armholes, overlapping the rear gores and tying the tapes together at the front or at the side. The construction is such that the operations of donning or removing are extremely simple and may be quickly and easily carried out with no strains or stresses exerted upon any part of the garment. By reason of its particular construction it adapts itself to the configuration of the human body and is form fitting, while at the same time it presents unlimited opportunity for styling at the front where it has heretofore been considerably restricted in this regard. By reason of the fact that the overlap occurs at the back, no opportunity is afforded for the garment coming open when walking or stretching the legs.

Having thus described my invention, I claim:

1. A wrap-around garment comprising a one piece structure combining waist and skirt portions, said structure including panels adapted to overlap at the rear of the wearer and each having an arm hole near its upper end, the edge of the underlying panel diverging from the upper part of its armhole portion to the waistline of the garment at the opposite side of the wearer, the overlapping panel having a neck portion extending over and detachably secured to the upper part of the armhole portion of the opposite panel, and ties secured to the waistline portions of said panels to encircle the waist and maintain the panels in overlapped relation.

2. A wrap-around garment comprising a one piece structure combining waist and skirt portions, said structure including panels adapted to overlap at the rear of the wearer and each having an armhole near its upper end, the edge of the underlying panel diverging from the upper part of its armhole portion to the waistline of the garment at the opposite side of the wearer, the overlapping panel extending over the underlying panel to substantially the opposite side of the garment, and ties secured to the waistline portions of said panels to encircle the waist and maintain the panels in overlapped relation.

3. A wrap-around garment, comprising a one piece structure combining waist and skirt portions, said structure including panels adapted to overlap at the rear of the wearer and each having an armhole near its upper end, the edge of the underlying panel diverging from the upper part of its armhole portion to the waist line of the garment at the opposite side of the wearer, the overlapping panel extending over the underlying panel to substantially the opposite side of the garment, and means at the waist line portion of said panels to hold the waist portion snugly to the waist and maintain the panels in overlapped relation.

MAX C. SCHRANK.